(12) United States Patent
Koike et al.

(10) Patent No.: US 8,687,390 B2
(45) Date of Patent: Apr. 1, 2014

(54) ACTIVE CLAMP DC-DC CONVERTER

(75) Inventors: Yasuhiro Koike, Aichi-ken (JP); Sergey Moiseev, Aichi-ken (JP); Masanori Tsuzaka, Aichi-ken (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 209 days.

(21) Appl. No.: 13/193,056

(22) Filed: Jul. 28, 2011

(65) Prior Publication Data

US 2012/0033456 A1  Feb. 9, 2012

(30) Foreign Application Priority Data

Aug. 3, 2010 (JP) ................. 2010-174215

(51) Int. Cl.
*H02M 3/335* (2006.01)
*H02H 7/122* (2006.01)

(52) U.S. Cl.
USPC .............. 363/56.09; 363/56.04; 363/21.04

(58) Field of Classification Search
USPC ................ 363/56.09, 21.04, 56.04
See application file for complete search history.

(56) References Cited

U.S. PATENT DOCUMENTS

| | | | |
|---|---|---|---|
| 4,441,146 | A | 4/1984 | Vinciarelli |
| 5,126,931 | A | 6/1992 | Jitaru |
| 5,880,940 | A | 3/1999 | Poon |
| 6,466,462 | B2 | 10/2002 | Nishiyama et al. |
| 2006/0013020 | A1 | 1/2006 | Aso |
| 2009/0096502 | A1 | 4/2009 | Miyamoto et al. |

FOREIGN PATENT DOCUMENTS

| | | |
|---|---|---|
| CN | 1351409 A | 5/2002 |
| JP | 2005-245097 A | 9/2005 |

OTHER PUBLICATIONS

Extended European Search Report dated Jun. 5, 2012 issued in European Application No. 11175549.2.
Park, K., "Three-Switch Active-Clamp Forward Converter With Low Switch Voltage Stress and Wide ZVS Range for High-Input-Voltage Applications", IEEE Transactions on Power Electronics, vol. 25, No. 4, Apr. 2010, pp. 889-898.
Jinno, M. et al. "Effects of Magnetizing Inductance on Active-clamped Forward Converters", IEICE/IEEE, Intelec '03, Oct. 19-23, 2003, pp. 636-642.
Office Action dated Aug. 6, 2013, issued by the State Intellectual Property Office of the People's Republic of China in counterpart Chinese Application No. 201110225291.0.

*Primary Examiner* — Bao Q Vu
*Assistant Examiner* — Zekre Tsehaye
(74) *Attorney, Agent, or Firm* — Sughrue Mion, PLLC

(57) ABSTRACT

An active clamp DC-DC converter includes a transformer having a primary coil and a secondary coil, a main switching device connected in series to the primary coil of the transformer so that the main switching device and the primary coil are connected in parallel to a DC power source, a reset capacitor, a reset switching device connected in series to the reset capacitor so that the reset switching device and the reset capacitor are connected in parallel to the primary coil of the transformer, a rectifying circuit connected to the secondary coil of the transformer, a smoothing circuit connected to the rectifying circuit, and a control circuit adjusting a dead time that elapses from the time when the reset switching device is turned off until the time when the main switching device is turned on, based on a voltage across the main switching device.

5 Claims, 4 Drawing Sheets

ACTIVE CLAMP DC-DC CONVERTER

BACKGROUND OF THE INVENTION

The present invention relates to an active clamp DC-DC converter.

FIG. 5 shows a circuit diagram of a conventional active clamp DC-DC converter. In the DC-DC converter designated generally by 50 in FIG. 5, when the main switching device 51 (MOSFET) is turned on, an excitation current flows from the DC power source 52 through the capacitor 53 to the primary coil of the transformer 54, so that a current flows through the diode 56 due to the electromotive force of the transformer 54. The current flowing through the diode 56 is output as DC power to the load through the rectifying circuit 57 having the diodes 55, 56 and the smoothing circuit 60 having the inductor 58 and the capacitor 59. When the main switching device 51 is turned off, a current flows through the diode 55 due to the electromotive force of the inductor 58. The current flowing through the diode 55 is output through the smoothing circuit 60 to the load as DC power. In this way, the main switching device 51 is turned on and off alternately so that constant DC output voltage is obtained from the DC power source 52 through the transformer 54. Such configuration is commonly known, as disclosed, for example, in Japanese Unexamined Patent Application Publication No. 2005-245097.

In the DC-DC converter 50, when the main switching device 51 is turned from on to off, the excitation current flowing through the primary coil of the transformer 54 flows through the parasitic diode of the reset switching device 61 (MOSFET) to the capacitor 62, so that the capacitor 62 is charged and the excitation current flowing through the primary coil of the transformer 54 is decreased. When the reset switching device 61 is then turned on, the energy in the capacitor 62 is discharged to the primary coil of the transformer 54 and the excitation current is further decreased, thereby resetting the transformer 54. In this way, resetting of the transformer 54 in the DC-DC converter 50 is done by an active clamp circuit composed of the reset switching device 61 and the capacitor 62.

In the DC-DC converter 50, the reset switching device 61 is turned on while the main switching device 51 is off and the excitation current flows through the parasitic diode of the reset switching device 61, resulting in reducing a loss when the reset switching device 61 is turned on. On the other hand, the loss occurring when the main switching device 51 is turned on can be reduced, for example, by turning on the main switching device 51 when the reset switching device 61 is turned off and then the voltage across the main switching device 51 drops to zero (see FIG. 6).

However, the voltage drop time it takes for the voltage across the main switching device 51 to drop to zero from the time when the reset switching device 61 is turned off is varied with the variation of the input voltage VL and the output voltage Vo of the DC-DC converter 50 and, therefore, it is difficult to specify the time when the voltage across the main switching device 51 would drop to zero and hence the time when the main switching device 51 should be turned on. This is for example because there is no clear correlation between the voltage drop time and the input voltage VL and also between the voltage drop time and the output voltage Vo, as shown in FIGS. 7A and 7B. Thus, it is difficult to turn on the main switching device 51 when the voltage across the main switching device 51 drops to zero, which makes it difficult to reduce the loss occurring when the main switching device 51 is turned on in the DC-DC converter 50.

For example, increasing the leakage inductance of the primary coil of the transformer 54 thereby to extend the period in which the voltage across the main switching device 51 is zero makes it easy to turn on the main switching device 51 while the voltage across the main switching device 51 is zero.

However, such increased leakage inductance of the primary coil of the transformer 54 shortens the transmission period from the primary coil to the secondary coil of the transformer 54, resulting in a drop of the maximum output voltage of the DC-DC converter 50. Further, the size of the primary coil of the transformer 54 needs to be enlarged, resulting in an increased cost and an enlarged circuit size.

The present invention is directed to providing an active clamp DC-DC converter that allows reduction of loss occurring when the main switching device is turned on while preventing a drop of the maximum output voltage and an increase of cost and circuit size of the DC-DC converter.

SUMMARY OF THE INVENTION

In accordance with an aspect of the present invention, an active clamp DC-DC converter includes a transformer having a primary coil and a secondary coil, a main switching device connected in series to the primary coil of the transformer so that the main switching device and the primary coil are connected in parallel to a DC power source, a reset capacitor, a reset switching device connected in series to the reset capacitor so that the reset switching device and the reset capacitor are connected in parallel to the primary coil of the transformer, a rectifying circuit connected to the secondary coil of the transformer, a smoothing circuit connected to the rectifying circuit, and a control circuit turning off the reset switching device while the main switching device is on, and turning on the reset switching device while the main switching device is off. The control circuit controls duty of a drive signal for driving the main switching device thereby to keep an output DC voltage from the smoothing circuit constant. The control circuit adjusts a dead time that elapses from the time when the reset switching device is turned off until the time when the main switching device is turned on, based on a voltage across the main switching device.

Other aspects and advantages of the invention will become apparent from the following description, taken in conjunction with the accompanying drawings, illustrating by way of example the principles of the invention.

BRIEF DESCRIPTION OF THE DRAWINGS

FIG. 3 is a flow chart explaining the operation for adjustment of the dead time that elapses from the time when the reset switching device is turned off until the time when the main switching device is turned on;

DETAILED DESCRIPTION OF THE EMBODIMENTS

Figure 1:
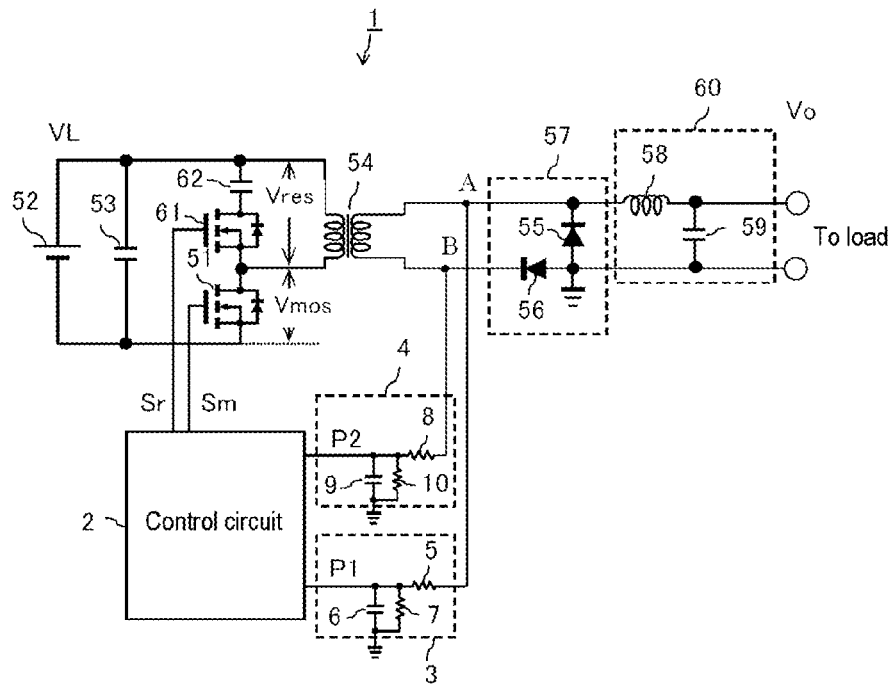
FIG. 1 is a circuit diagram of an active clamp DC-DC converter according to an embodiment of the present invention.

FIG. 1 shows an active clamp DC-DC converter according to the embodiment of the present invention. In the drawing, same reference numerals are used for the common elements or components in the present embodiment and the conventional DC-DC converter 50 of FIG. 5.

Figure 5:
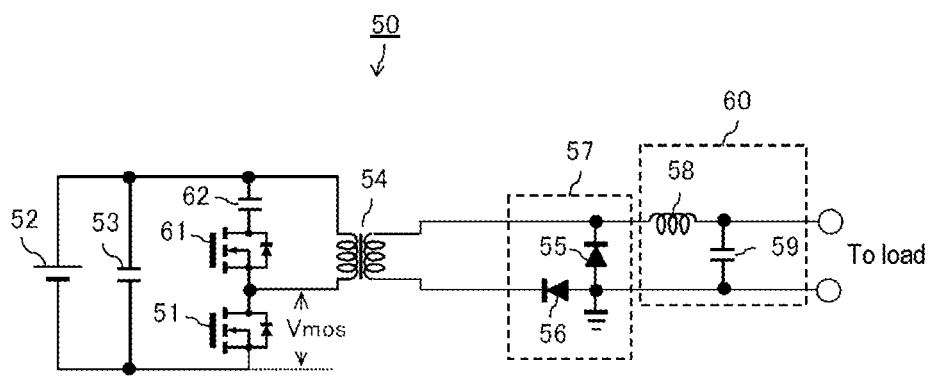
FIG. 5 is a circuit diagram of a conventional active clamp DC-DC converter.
Figure 6:
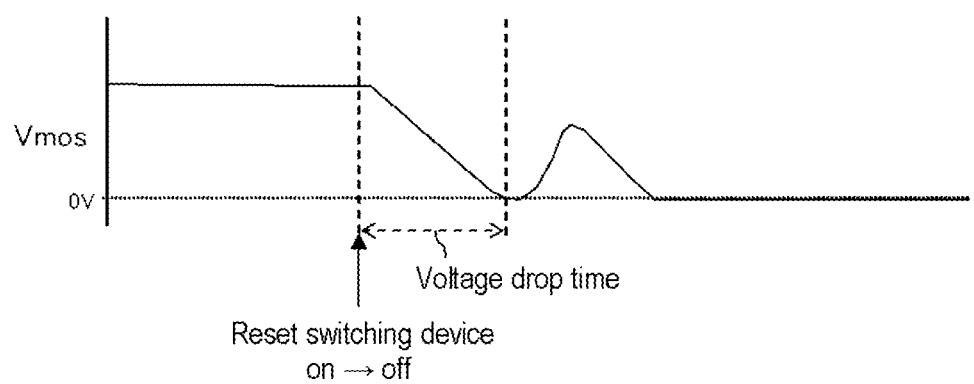
FIG. 6 is a diagram showing the voltage Vmos across the main switching device of the conventional active clamp DC-DC converter.
Figure 7A:
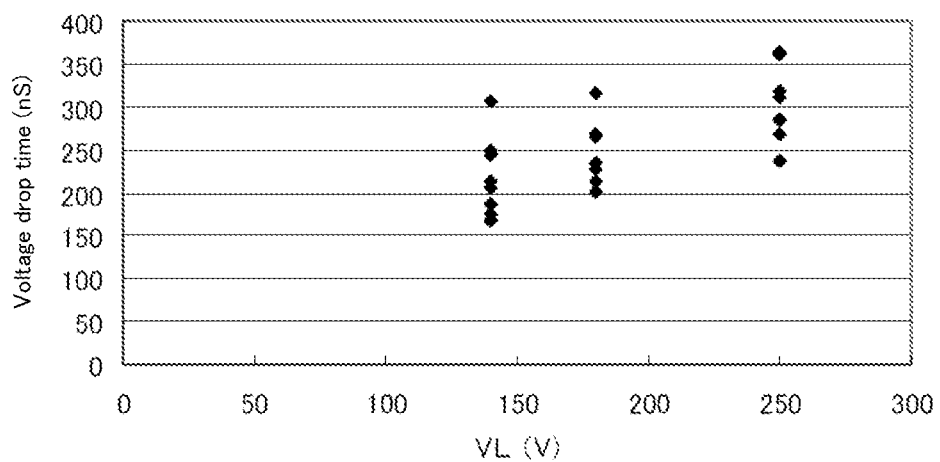
FIG. 7A is a diagram showing the relation between the input voltage of the conventional active clamp DC-DC converter and the voltage drop time taken for the voltage across the main switching device to drop to zero from the time when the reset switching device is turned off.
Figure 7B:
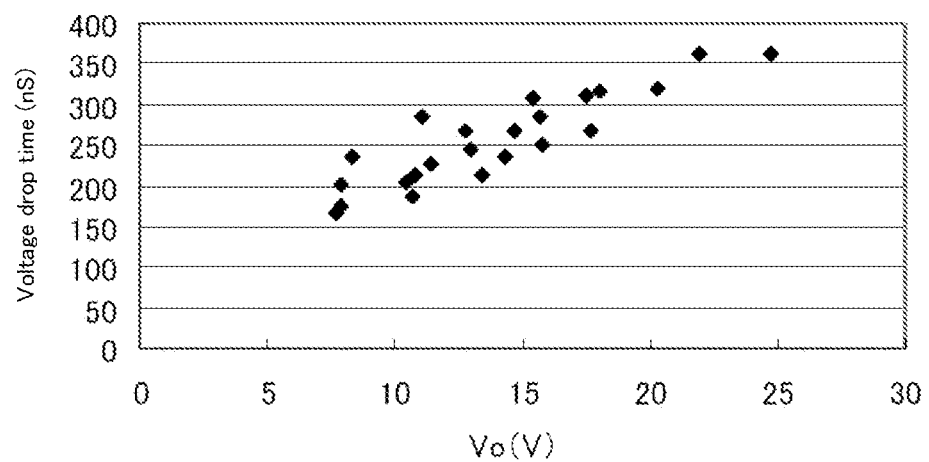
FIG. 7B is a diagram showing the relation between the output voltage of the active clamp DC-DC converter and the voltage drop time taken for the voltage across the main switching device to drop to zero from the time when the reset switching device is turned off.

The active clamp DC-DC converter designated generally by 1 includes a control circuit 2 and two voltage detection circuits 3, 4, in addition to the capacitor 53, the transformer 54, the DC power source 52, the main switching device 51, the capacitor 62, the reset switching device 61, the rectifying circuit 57 and the smoothing circuit 60 of the conventional DC-DC converter 50 of FIG. 5. In the active clamp DC-DC converter 1, the main switching device 51 and the primary coil of the transformer 54 are connected in series with each other and in parallel to the DC power source 52. The capacitor 62 (reset capacitor) and the reset switching device 61 are connected in series with each other and in parallel to the primary coil of the transformer 54. The voltage detection circuit 3 detects the voltage (VA-GND) between one end of the secondary coil of the transformer 54 (hereinafter referred to as node A) and the ground (GND) of the secondary coil of the transformer 54, and outputs the detected voltage (VA-GND) as an analog signal to the control circuit 2. The voltage detection circuit 4 detects the voltage (VB-GND) between the other end of the secondary coil of the transformer 54 (hereinafter referred to as node B) and the ground (GND) of the secondary coil of the transformer 54, and outputs the detected voltage (VB-GND) as an analog signal to the control circuit 2. Instead of MOSFET, IGBT (Insulated Gate Bipolar Transistor) having parallel connected diodes may be used for the main switching device 51 and the reset switching device 61.

In the rectifying circuit 57, the anode of the diode 55 (first diode) is connected to the ground of the secondary coil of the transformer 54, and the cathode of the diode 55 is connected to one end of the secondary coil of the transformer 54. The anode of the diode 56 (second diode) is connected to the anode of the diode 55, and the cathode of the diode 56 is connected to the other end of the secondary coil of the transformer 54.

In the smoothing circuit 60, the capacitor 59 is connected in parallel to the diode 55, and the inductor 58 is provided between the secondary coil of the transformer 54 and the capacitor 59. The voltage detection circuit 3 is composed of resistors 5, 7 and a capacitor 6. The resistor 5 is provided between the node A and the ADC (Analog-Digital Converter) port P1 of the control circuit 2. The capacitor 6 is provided between the ADC port P1 of the control circuit 2 and the ground of the secondary coil of the transformer 54. The resistor 7 is connected in parallel to the capacitor 6.

The voltage detection circuit 4 is composed of resistors 8, 10 and a capacitor 9. The resistor 8 is provided between the node B and the ADC port P2 of the control circuit 2. The capacitor 9 is provided between the ADC port P2 of the control circuit 2 and the ground of the secondary coil of the transformer 54. The resistor 10 is connected in parallel to the capacitor 9.

The control circuit 2 turns off the reset switching device 61 while the main switching device 51 is on, and turns on the reset switching device 61 while the main switching device 51 is off. The control circuit 2 controls the duty of the signal for driving the main switching device 51 thereby to keep the output DC voltage from the smoothing circuit 60 constant.

Figure 2:
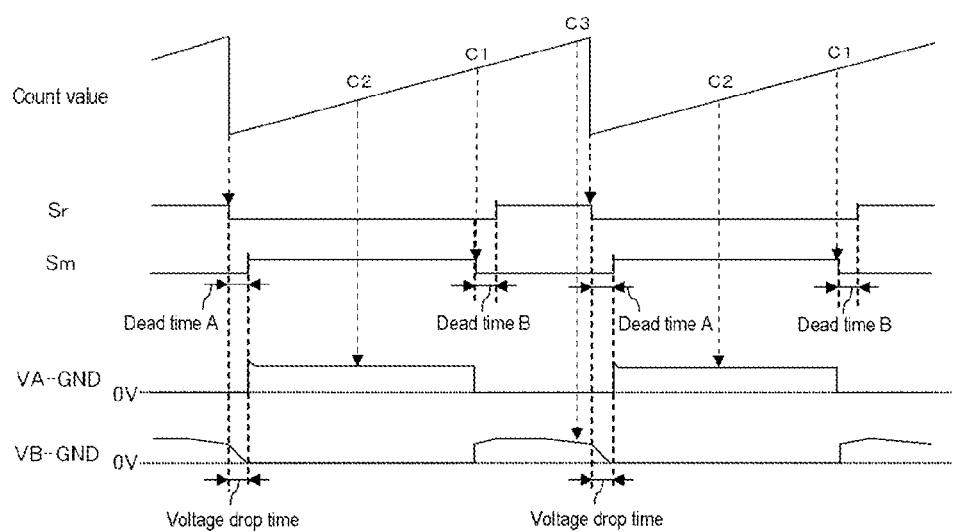
FIG. 2 is an example of drive signals Sm, Sr, and signals of voltage (VA-GND) and of voltage (VB-GND)

As shown in FIG. 2, the control circuit 2 produces the drive signal Sm for the main switching device 51 and the drive signal Sr for the reset switching device 61, based on the count value of the up counter that is reset to zero periodically at a given period of time or each time a predetermined count is reached. When the count value is reset to zero, the drive signal Sr goes from high to low level, and the reset switching device 61 is turned from on to off. The drive signal Sm goes from low to high level after the dead time A elapses, and the main switching device 51 is turned from off to on. When the count value reaches C1 that corresponds to the duty of the drive signal Sm calculated by the control circuit 2 based on the input voltage VL and the output voltage Vo of the DC-DC converter 1 so that the output voltage Vo is kept constant, the drive signal Sm goes from high to low level, and the main switching device 51 is turned from on to off. The drive signal Sr goes from low to high level after the dead time B elapses, and the reset switching device 61 is turned from off to on. Such operations are repeated, so that the main switching device 51 and the reset switching device 61 are alternately turned on and off, and the output voltage Vo is kept constant.

The control circuit 2 adjusts the dead time A that elapses from the time when the reset switching device 61 is turned off until the time when the main switching device 51 is turned on. The dead time B that elapses from the time when the main switching device 51 is turned off until the time when the reset switching device 61 is turned on is fixed.

Figure 3:
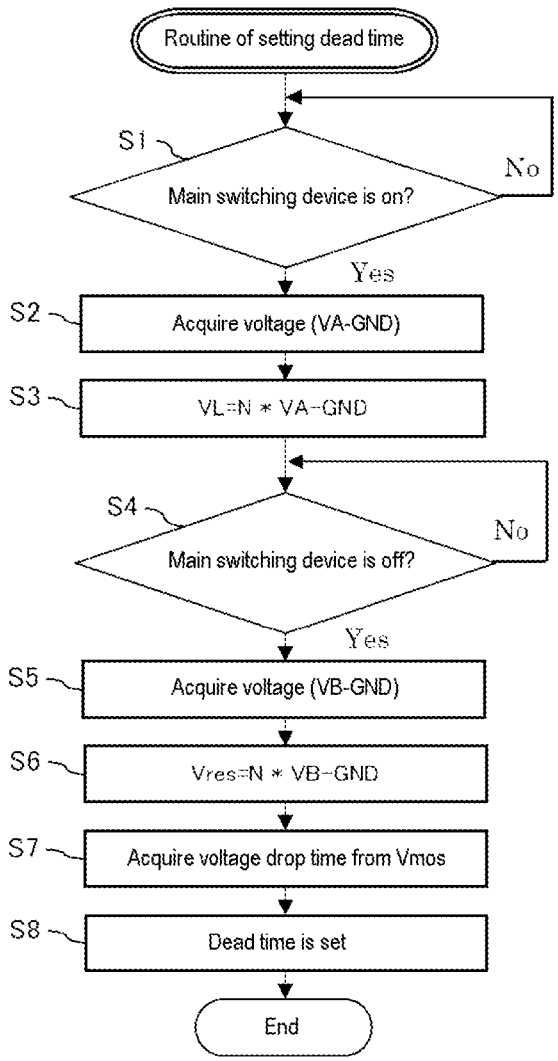

FIG. 3 is a flow chart explaining the operation of the control circuit 2 for adjustment of the dead time A. Firstly, it is determined at S1 by the control circuit 2 whether the main switching device 51 is on.

When it is determined at S1 that the main switching device 51 is on, the control circuit 2 acquires a signal of the voltage (VA-GND) at S2, and then calculates the input voltage VL of the DC-DC converter 1 or the voltage across the primary coil of the transformer 54 at S3 by multiplying the acquired voltage (VA-GND) by the ratio of turns N of the transformer 54, specifically, the ratio of the number of turns of the secondary coil to the number of turns of the primary coil. For example, the control circuit 2 acquires the signal of the voltage (VA-GND) at the count value C2 that corresponds to approximately the middle of the period during which the main switching device 51 is on (see FIG. 2).

Then it is determined at S4 by the control circuit 2 whether the main switching device 51 is off. When it is determined at S4 that the main switching device 51 is off, the control circuit 2 acquires a signal of the voltage (VB-GND) at S5, and then calculates the voltage Vres across the reset switching device 61 and the capacitor 62 at S6 by multiplying the acquired voltage (VB-GND) by the ratio of turns N of the transformer 54. For example, the control circuit 2 acquires the signal of the voltage (VB-GND) at the count value C3 that corresponds to the time just before the reset switching device 61 is turned off while the main switching device 51 is off (see FIG. 2).

At S7, the control circuit 2 calculates the voltage Vmos across the main switching device 51 by adding the input voltage VL to the voltage Vres, and then acquires the voltage drop time that is associated with the calculated voltage Vmos, specifically the time it takes for the voltage Vmos across the main switching device 51 to drop to zero from the time when the reset switching device 61 is turned off, from a map previously stored in the control circuit 2.

Figure 4:
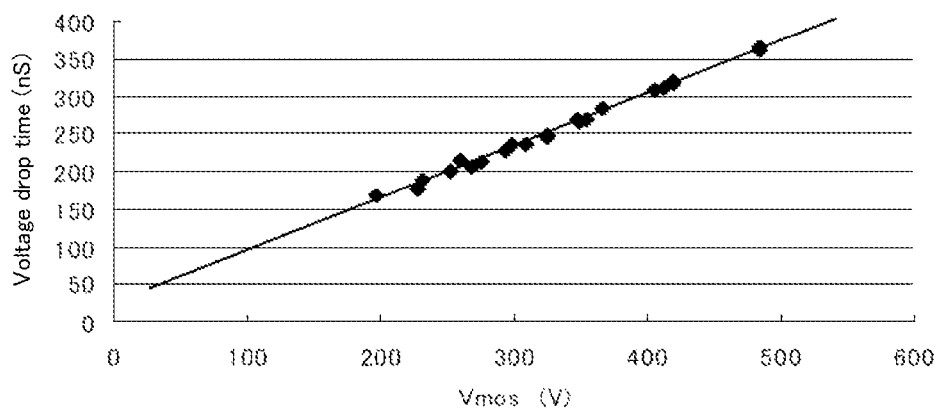
FIG. 4 is a diagram showing the relation between the voltage Vmos across the main switching device just before the reset switching device is turned off and the voltage drop time it takes for the voltage across the main switching device to drop to zero from the time when the reset switching device is turned off.

Then at S8, the control circuit 2 sets the thus acquired voltage drop time as the dead time A for the subsequent control timing, specifically the dead time A just after the second reset of the count value since the last acquisition of the signal of the voltage (VB-GND). For example, the relation between the voltage drop time and the voltage Vmos just before the reset switching device is turned off, as shown in FIG. 4, may be previously stored as the map in the control circuit 2, and the control circuit 2 may acquire the voltage drop time based on such map. In MOSFETs of any ratings, generally, the voltage drop time is proportional to the voltage Vmos, as shown in FIG. 4.

As described above, the active clamp DC-DC converter 1 of the present embodiment allows the dead time A that elapses from the time when the reset switching device 61 is turned off until the time when the main switching device 51 is turned on to be adjusted so that the main switching device 51 is turned on at the time when the voltage Vmos across the main switching device 51 drops to zero after the reset switching device 61 is turned off, thereby reducing loss occurring when the main switching device 51 is turned on. Further, there is no need to increase the inductance of the primary coil of the transformer 54, thereby helping to prevent a drop of the maximum output voltage and an increase of the cost and the circuit size. The reduction of loss on the main switching device 51 reduces the thermal influence of the main switching device 51 on other components of the DC-DC converter 1. Further, the signals of the voltage (VA-GND) and the voltage (VB-GND) are input to the control circuit 2 without using components for insulated signal transmission such as photocoupler and transformer, which prevents an increase of the cost and the circuit size.

In the above embodiment, the control circuit 2 may stop driving the main switching device 51 and the reset switching device 61 when the voltage (VA-GND) is equal to or higher than a predetermined threshold Vth1. By doing so, if the input voltage VL is excessive, the control circuit 2 may stop driving the main switching device 51 and the reset switching device 61 before an excessive voltage is applied to the main switching device 51 and the reset switching device 61.

In the above embodiment, the control circuit 2 may decrease the duty of the drive signal Sm for the main switching device 51 when the voltage Vmos is equal to or higher than a predetermined threshold Vth2. By so doing, if the input voltage VL is low, the control circuit 2 may decrease the duty of the drive signal Sm so that no excessive voltage is applied to the main switching device 51. The thresholds Vth1, Vth2 may be of the same value or different from each other.

In the above embodiment, a capacitor may be connected in parallel to the main switching device 51. By this modification, the excitation current flowing through the primary coil of the transformer 54 flows gradually through the capacitor connected in parallel to the main switching device 51 when the main switching device 51 is turned from on to off, which allows reduction of loss occurring when the main switching device is turned off. When MOSFET is used for the main switching device 51, a capacitor built in the MOSFET may be used for such purpose.

What is claimed is:

1. An active clamp DC-DC converter, comprising:
a transformer having a primary coil and a secondary coil;
a main switching device connected in series to the primary coil of the transformer, the main switching device and the primary coil being connected in parallel to a DC power source;
a reset capacitor;
a reset switching device connected in series to the reset capacitor, the reset switching device and the reset capacitor being connected in parallel to the primary coil of the transformer;
a rectifying circuit connected to the secondary coil of the transformer;
a smoothing circuit connected to the rectifying circuit; and
a control circuit turning off the reset switching device while the main switching device is on, and turning on the reset switching device while the main switching device is off, the control circuit controlling duty of a drive signal for driving the main switching device thereby to keep an output DC voltage from the smoothing circuit constant,
wherein the control circuit adjusts a dead time that elapses from the time when the reset switching device is turned off until the time when the main switching device is turned on, based on a voltage across the main switching device, wherein
the control circuit calculates the voltage across the main switching device just before the reset switching device is turned off, by adding a voltage between one end of the secondary coil and ground of the secondary coil while the main switching device is on to a voltage between the other end of the secondary coil and the ground while the main switching device is off.

2. The active clamp DC-DC converter according to claim 1, wherein relation between a voltage drop time it takes for the voltage across the main switching device to drop to zero from the time when the reset switching device is turned off and the voltage across the main switching device just before the reset switching device is turned off is stored as a map in the control circuit, and the voltage drop time obtained from the map is set as the dead time.

3. The active clamp DC-DC converter according to claim 2, wherein the rectifying circuit includes a first diode and a second diode, an anode of the first diode is connected to the ground of the secondary coil of the transformer, a cathode of the first diode is connected to one end of the secondary coil of the transformer, an anode of the second diode is connected to the anode of the first diode, and a cathode of the second diode is connected to the other end of the secondary coil of the transformer.

4. The active clamp DC-DC converter according to claim 3, wherein the control circuit stops driving the main switching device and the reset switching device when the voltage between one end of the secondary coil and the ground is equal to or higher than a predetermined threshold while the main switching device is on.

5. The active clamp DC-DC converter according to claim 3, wherein the control circuit decreases the duty of the drive signal for the main switching device when the sum of the voltage between one end of the secondary coil and the ground while the main switching device is on and the voltage between the other end of the secondary coil and the ground while the main switching device is off is equal to or higher than a predetermined threshold.

* * * * *